United States Patent
Kim et al.

(10) Patent No.: US 10,054,513 B2
(45) Date of Patent: Aug. 21, 2018

(54) APPARATUS AND METHOD OF SENSING LIQUID LEAKAGE FOR LITHOGRAPHY APPARATUS

(71) Applicants: Sung-Joo Kim, Hwaseong-si (KR);
Jin-Pyoung Kim, Suwon-si (KR);
Do-Hyun Seo, Hwaseong-si (KR);
Jae-Pil Lee, Hwaseong-si (KR);
Hyun-Hoon Lee, Hwaseong-si (KR);
Sung-Jo Hwang, Anseong-si (KR)

(72) Inventors: Sung-Joo Kim, Hwaseong-si (KR);
Jin-Pyoung Kim, Suwon-si (KR);
Do-Hyun Seo, Hwaseong-si (KR);
Jae-Pil Lee, Hwaseong-si (KR);
Hyun-Hoon Lee, Hwaseong-si (KR);
Sung-Jo Hwang, Anseong-si (KR)

(73) Assignee: Samsung Electronics Co., Ltd. (KR)

( * ) Notice: Subject to any disclaimer, the term of this patent is extended or adjusted under 35 U.S.C. 154(b) by 419 days.

(21) Appl. No.: 14/801,113

(22) Filed: Jul. 16, 2015

(65) Prior Publication Data

US 2016/0153862 A1 Jun. 2, 2016

(30) Foreign Application Priority Data

Nov. 27, 2014 (KR) ........................ 10-2014-0167105

(51) Int. Cl.
*G01M 3/26* (2006.01)
*G01M 3/20* (2006.01)
*G01M 3/32* (2006.01)

(52) U.S. Cl.
CPC .............. *G01M 3/26* (2013.01); *G01M 3/202* (2013.01); *G01M 3/3227* (2013.01)

(58) Field of Classification Search
CPC ....... G01M 3/202; G01M 3/3227; G01M 3/26
USPC ............................................................. 73/40
See application file for complete search history.

(56) References Cited

U.S. PATENT DOCUMENTS

| | | | |
|---|---|---|---|
| 5,138,643 A | * | 8/1992 | Sakamoto ........... G03F 7/70008 378/34 |
| 7,060,993 B2 | | 6/2006 | Wedowski et al. |
| 7,219,541 B2 | | 5/2007 | DiFoggio |
| 7,462,842 B2 | | 12/2008 | Wedowski et al. |
| 7,705,334 B2 | | 4/2010 | Yabuta et al. |
| 8,173,984 B2 | | 5/2012 | Moriya et al. |
| 8,258,485 B2 | | 9/2012 | Levesque et al. |
| 8,536,550 B2 | | 9/2013 | Asayama et al. |

(Continued)

FOREIGN PATENT DOCUMENTS

| KR | 10-0211639 B1 | 5/1999 |
|---|---|---|
| KR | 10-2004-0102031 | 12/2004 |
| KR | 10-2013-0069635 | 6/2013 |

*Primary Examiner* — Daniel S Larkin
(74) *Attorney, Agent, or Firm* — Myers Bigel, P.A.

(57) ABSTRACT

Provided are an apparatus and method of sensing liquid leakage for a lithography apparatus, which can prevent a collector mirror from being contaminated by sensing leakage of cooling water supplied to the collector mirror of an extreme ultraviolet (EUV) light generating apparatus. The liquid leakage sensing apparatus includes a collector mirror module, a cooling unit configured to supply a cooling water to one surface of the collector mirror module, a gas supply unit configured to supply a water soluble gas to the cooling unit, and a sensing unit configured to sense the water soluble gas having leaked to the outside of the cooling unit.

12 Claims, 15 Drawing Sheets

(56) References Cited

U.S. PATENT DOCUMENTS

| | | |
|---|---|---|
| 2007/0054497 A1 | 3/2007 | Weiss et al. |
| 2007/0091485 A1* | 4/2007 | Phillips .................... G02B 5/10 |
| | | 359/857 |
| 2007/0140910 A1* | 6/2007 | Banine ................. G01N 25/142 |
| | | 422/83 |
| 2010/0112494 A1 | 5/2010 | Kraus et al. |
| 2011/0211179 A1 | 9/2011 | Kraus et al. |
| 2012/0228527 A1 | 9/2012 | Abe et al. |
| 2013/0088697 A1 | 4/2013 | Labetski et al. |
| 2013/0306110 A1 | 11/2013 | De Dea et al. |

\* cited by examiner

1

<u>4</u>

APPARATUS AND METHOD OF SENSING LIQUID LEAKAGE FOR LITHOGRAPHY APPARATUS

CROSS-REFERENCE TO RELATED APPLICATION

This application claims priority from Korean Patent Application No. 10-2014-0167105 filed on Nov. 27, 2014 in the Korean Intellectual Property Office, and all the benefits accruing therefrom under 35 U.S.C. 119, the contents of which in its entirety are herein incorporated by reference.

FIELD

The present inventive concept relates to an apparatus and method of sensing liquid leakage for a lithography apparatus.

BACKGROUND

Recently, in order to achieve micro-fabrication of semiconductor devices, a lithography process using extreme ultra violet (EUV) radiation has been proposed. In the lithographic process, light, also referred to as a light beam, may be projected on a silicon substrate through a mask having a circuit pattern, thereby forming an electronic circuit by exposing a photoresist material.

The minimal processing dimensions of the circuit formed by optical lithography are generally dependent on the wavelength of the light source. Accordingly, in order to produce circuitry having smaller geometries, a shorter wavelength of light may be used in a light source used for a photolithographic process. As a next-generation lithography light source, a EUV light source is suitably used. Extreme ultraviolet (EUV) radiation has a wavelength of from approximately 1 to 100 nm. Since light within this range has high absorptivity with respect to many materials, a transmissive optical system, such as a lens, may not be used but a reflective optical system may be used.

In order to generate EUV radiation, laser produced plasma (LPP) and discharge produced plasma (DPP) driven by pulse power technology may be used.

SUMMARY

The present inventive concept provides a liquid leakage sensing apparatus, which can prevent a collector mirror from being contaminated by sensing leakage of cooling water supplied to the collector mirror of an extreme ultraviolet (EUV) light generating apparatus. Here, water soluble gas is used in sensing leakage of cooling water.

The present inventive concept also provides a liquid leakage sensing method, which can prevent a collector mirror from being contaminated by sensing leakage of cooling water supplied to the collector mirror of an extreme ultraviolet (EUV) light generating apparatus.

These and other objects of the present inventive concept will be described in or be apparent from the following description of the preferred embodiments.

According to an aspect of the present inventive concept, there is provided a liquid leakage sensing apparatus including a collector mirror module, a cooling unit configured to supply cooling water to one surface of the collector mirror module, a gas supply unit configured to supply a water soluble gas to the cooling unit, and a sensing unit configured to sense the water soluble gas having leaked to the outside of the cooling unit.

According to another aspect of the present inventive concept, there is provided a liquid leakage sensing apparatus including a vessel, a light source configured to supply a light to the vessel, a droplet generator configured to generate a droplet using the light supplied to the vessel, a collector mirror disposed in the vessel and configured to collect and reflect EUV light generated by a reaction between the light and the droplet, a cooling unit disposed at one side of the collector mirror and configured to supply cooling water to one surface of the collector mirror to adjust a temperature of the collector mirror, a gas supply unit supplying a water soluble gas to the cooling unit, and a sensing unit sensing whether the water soluble gas having leaked to the outside of the cooling unit exists in the vessel or not.

According to still another aspect of the present inventive concept, there is provided a liquid leakage sensing apparatus including an object, a liquid supply unit configured to supply a process liquid to a liquid receiving space formed in contact with one surface of the object, a gas supply unit configured to supply a water soluble gas to the liquid supply unit, and a sensing unit configured to sense the water soluble gas having leaked to the outside of the liquid receiving space.

According to a further aspect of the present inventive concept, there is provided a liquid leakage sensing apparatus including a vessel in which light reacts with a droplet to generate EUV light, a cooling unit configured to supply cooling water to the inside of the vessel, a gas supply unit configured to supply a water soluble gas to the cooling unit, and a sensing unit configured to sense whether the water soluble gas having leaked to the outside of the cooling unit exists in the vessel or not.

According to yet another aspect of the present inventive concept, there is provided a liquid leakage sensing method including providing cooling water including a water soluble gas to an object in a vessel, and sensing whether the water soluble gas having leaked to the outside of the object exists in the vessel or not, wherein the sensing comprises measuring a partial pressure of the water soluble gas.

BRIEF DESCRIPTION OF THE DRAWINGS

The above and other features and advantages of the present inventive concept will become more apparent by describing in detail preferred embodiments thereof with reference to the attached drawings in which.

DETAILED DESCRIPTION OF THE EMBODIMENTS

Figure 1:
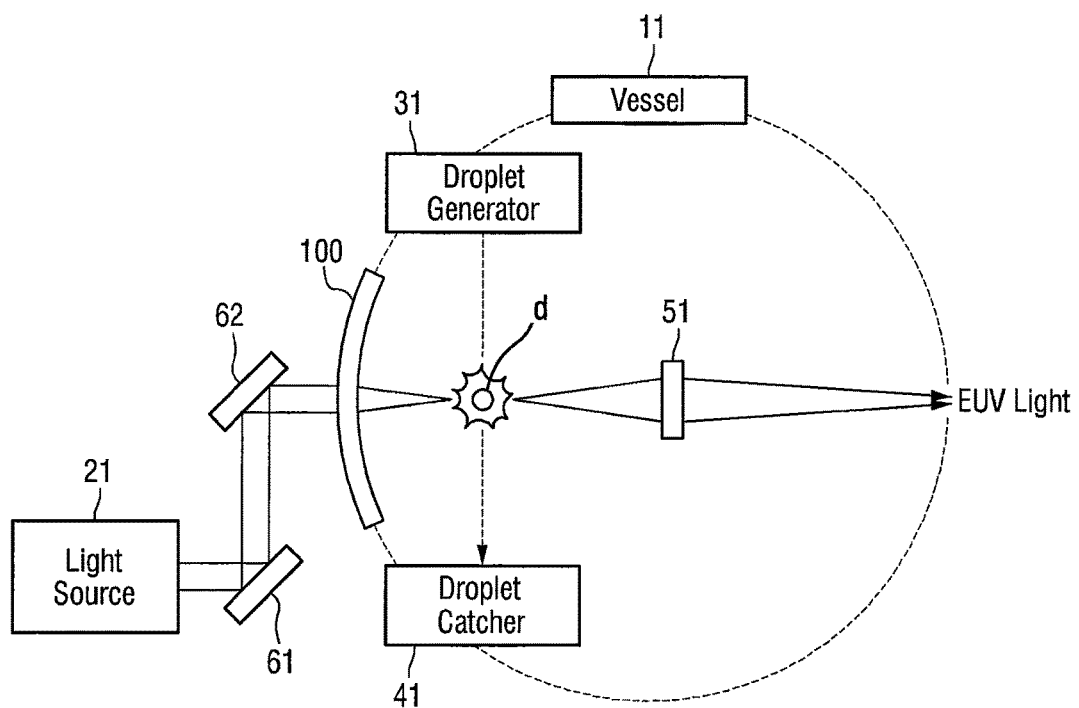
FIG. 1 schematically illustrates an extreme ultraviolet (EUV) light generating apparatus.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The present invention will be described with reference to perspective views, cross-sectional views, and/or plan views, in which preferred embodiments of the invention are shown. Thus, the profile of an exemplary view may be modified according to manufacturing techniques and/or allowances. That is, the embodiments of the invention are not intended to limit the scope of the present invention but cover all changes and modifications that can be caused due to a change in manufacturing process. Thus, regions shown in the drawings are illustrated in schematic form and the shapes of the regions are presented simply by way of illustration and not as a limitation.

Hereinafter, exemplary embodiments in accordance with principles of inventive concepts will be explained in detail with reference to the accompanying drawings.

First, an extreme ultraviolet (EUV) light generating apparatus will be described with reference to FIG. 1.

FIG. 1 schematically illustrates an extreme ultraviolet (EUV) light generating apparatus.

Referring to FIG. 1, EUV light is generated using a chemical reaction taking place in the vessel 11. A droplet generator 31 providing a droplet d and a droplet catcher 41 vertically spaced apart from the droplet generator 31 and receiving the droplet d are disposed in the vessel 11.

The droplet d may include at least one of tin (Sn), lithium (Li), and xenon (Xe). In detail, the droplet d may be a gas such as tin (Sn), lithium (Li), or xenon (Xe), or a cluster of gases. The droplet d is preferably provided in a vacuum environment. For example, the vacuum environment in which the drop d is provided is preferably about 1 mbar.

The light source 21 provides first light. That is to say, the first light supplied from the light source 21 interacts with the droplet d and generates EUV light. The first light supplied from the light source 21 may be supplied to the droplet d in the vessel 11 along reflecting mirrors 61 and 62. The first light may be generated by, for example, a $CO_2$ laser. In particular, the first light may be $CO_2$ laser light having a high pulse of 40 kHz or greater and oscillating with a wavelength of 9.3 μm or 10.6 μm.

A collector mirror 100 is disposed on one surface of the vessel 11. A hole is formed in the center of the collector mirror 100, so that the first light supplied from the light source 21 may be supplied to the inside of the vessel 11. The droplet d supplied from the droplet generator 31 reacts with the first light supplied to the inside of the vessel 11 to generate EUV light. The collector mirror 100 collects and reflects the generated EUV light to focus the EUV light on a focusing lens 51 and to emit the EUV light to the outside of the vessel 11. The thus generated EUV light may be used for a lithography apparatus during a lithography process.

Here, since the reflectivity of the collector mirror 100 affects the radiation intensity of emitted EUV light, it is important to maintain the collector mirror 100 in a clean state. However, after prolonged use of the EUV light generating apparatus, the collector mirror 100 in the vessel 11 may be contaminated by droplet deposits. The contaminated collector mirror 100 may have lowered reflectivity, so that the output of emitted EUV light may also be lowered. According to the present inventive concept, the contamination of the collector mirror 100 can be sensed at an early stage, thereby continuously preventing the collector mirror 100 from being contaminated by taking an immediate measure.

Figure 2:
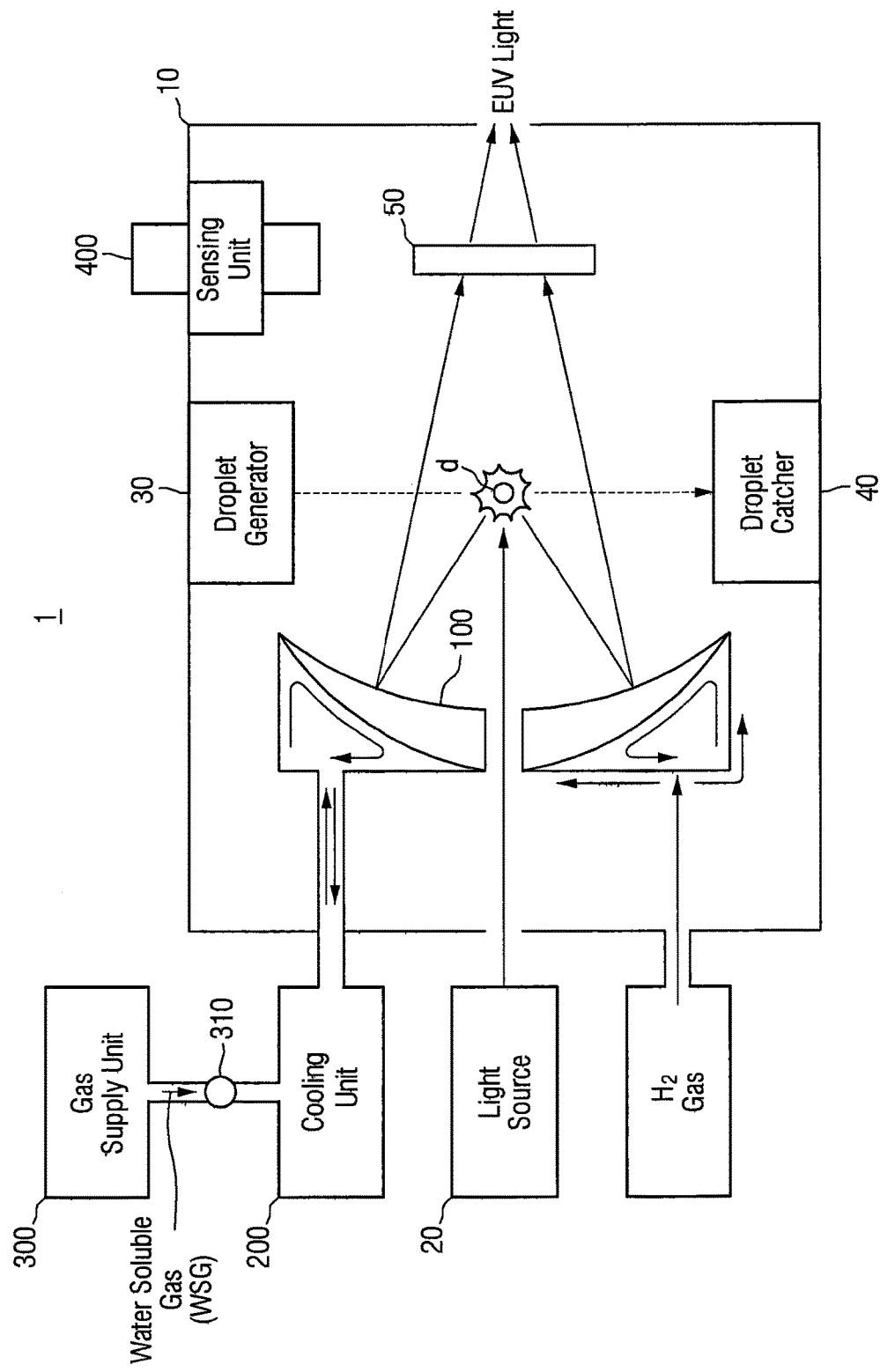
FIG. 2 schematically illustrates a liquid leakage sensing apparatus according to an embodiment of the present inventive concept.
Figure 3:
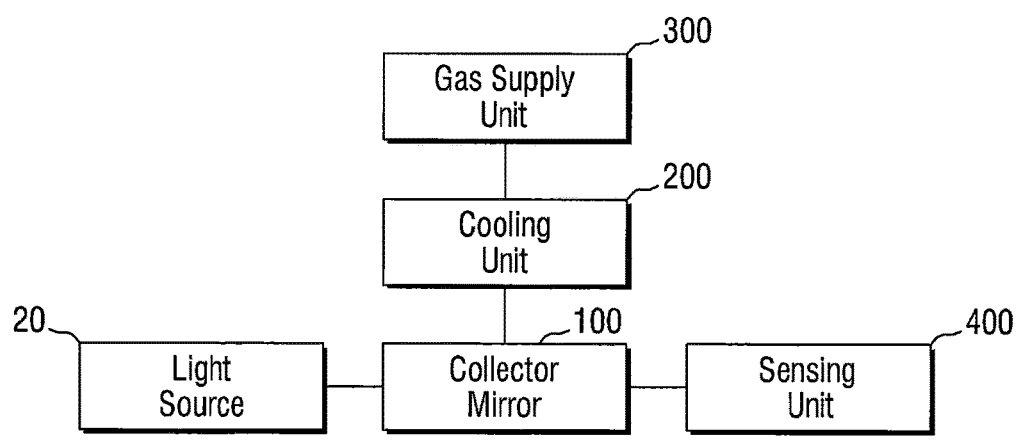
FIG. 3 is a block diagram of the liquid leakage sensing apparatus shown in FIG. 2.
Figure 4:
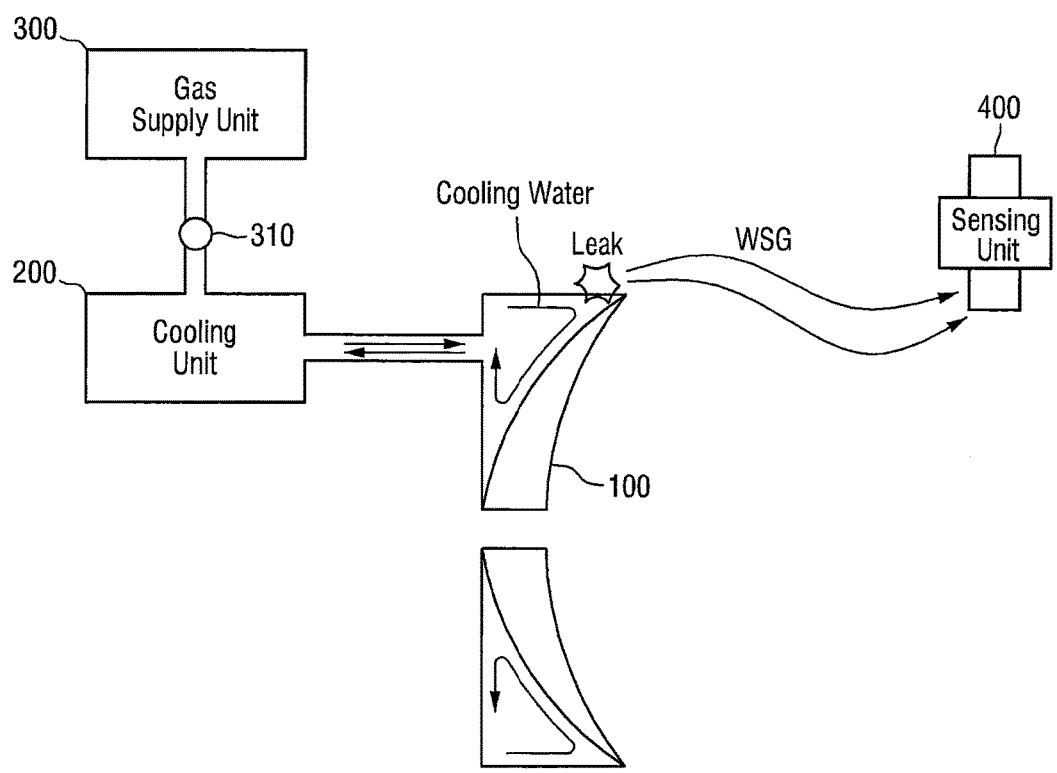
FIG. 4 illustrates operations of the liquid leakage sensing apparatus shown in FIG. 2.

FIG. 2 schematically illustrates a liquid leakage sensing apparatus according to an embodiment of the present inventive concept, FIG. 3 is a block diagram of the liquid leakage sensing apparatus shown in FIG. 2 and FIG. 4 illustrates operations of the liquid leakage sensing apparatus shown in FIG. 2.

Referring to FIGS. 2 and 3, the liquid leakage sensing apparatus 1 according to an embodiment of the present inventive concept includes a vessel 10, a light source 20, a droplet generator 30, a droplet catcher 40, a focusing lens 50, a collector mirror 100, a cooling unit 200, a gas supply unit 300, and a sensing unit 400.

The vessel 10 is a space for receiving devices for generating EUV light. In the vessel 10, a droplet d and first light supplied from the light source 20 react with each other to generate the EUV light. A droplet generator 30 and a droplet catcher 40 may be disposed in the vessel 10 and the collector mirror 100 may be disposed on a rear surface of the vessel 10. The sensing unit 400 may be disposed on one surface of the vessel 10 and may analyze kinds and concentrations of gases contained in the internal space of the vessel 10. The vessel 10 may have a generally closed space. However, a hole for light entrance and emission may be formed on one surface of the vessel 10.

The light source 20 provides a first light. Here, the light first light may be generated by, for example, a $CO_2$ laser. In particular, the first light may be $CO_2$ laser light having a high pulse of 40 kHz or greater and oscillating with a wavelength of 9.3 μm or 10.6 μm. The first light supplied from the light source 20 may interact with the droplet d supplied from the droplet generator 30 to generate EUV light.

The droplet generator 30 provides the droplet d to the inside of the vessel 10. For example, the droplet generator 30 may be disposed on a top surface of the vessel 10 and may provide the droplet d toward a bottom surface of the vessel 10. The droplet catcher 40 may be disposed on the bottom surface of the vessel 10 and may receive the droplet d supplied from the droplet generator 30. The droplet d supplied to the inside of the vessel 10 may interact with the first light supplied from the light source 20 to generate EUV light. Therefore, the droplet d may include at least one of tin (Sn), lithium (Li), and xenon (Xe). In detail, the droplet d may be a gas such as tin (Sn), lithium (Li), or xenon (Xe), or a cluster of gases.

A focusing lens 50 may be disposed within the vessel 10 to focus the EUV light generated by the interaction of the droplet d and the first light thereon and may emit the EUV light to the outside of the vessel 10.

The collector mirror 100 may be disposed on a rear surface of the vessel 10 and may collect and reflect the EUV light generated by the interaction of the droplet d and the first light. Here, since the EUV light having reached the collector mirror 100 is reflected back, the collector mirror 100 may have an increased temperature. Accordingly, the cooling unit 200 may be disposed on one surface of the collector mirror 100 to adjust the temperature of the collector mirror 100.

The cooling unit 200 supplies cooling water to one surface of the collector mirror 100. The cooling water may be supplied to the one surface of the collector mirror 100 from a storage tank of the cooling unit 200 disposed outside the vessel 10 along a cooling line. The cooling water circulates in the cooling unit 200 and the cooling unit 200 has a closed space to prevent the cooling water from leaking to the outside. However, there may be a leak probability of the cooling water due to a hardware architecture defect of the cooling unit 200. When some of the cooling water is adhered to a reflecting surface of the collector mirror 100, droplet deposits may be deposited on the reflecting surface of the collector mirror 100.

When the droplet deposits are deposited on the reflecting surface of the collector mirror 100, reflection efficiency of the collector mirror 100 may be lowered, resulting in a reduction in the output of the EUV light generating apparatus. If it is possible to sense in advance whether the cooling water has leaked or not, a proper measure can be taken to address the hardware architecture defect of the cooling unit 200. However, if it is not possible to sense in advance whether the cooling water has leaked or not, the collector mirror 100 may be contaminated and a measure to be taken after the collector mirror 100 is contaminated may increase temporal and economic costs. Further, the conventional sensing device may make it difficult to sense whether cooling water has leaked or not.

According to the present inventive concept, a water soluble gas (WSG) is injected into the cooling water, thereby sensing whether the water soluble gas (WSG) exists within the vessel 10 or not. When the cooling water has leaked, the water soluble gas (WSG) dissolved in the cooling water may exist in a space of the vessel 10 and leakage of the cooling water can be easily sensed by detecting the water soluble gas (WSG).

The gas supply unit 300 may inject the water soluble gas (WSG) into the cooling unit 200. Here, the water soluble gas (WSG) may include, for example, at least one of Kr, He, Ar, and $CO_2$. The water soluble gas (WSG) injected into the cooling unit 200 may be a gas that does not react with a process gas (e.g., $H_2$ gas) contained in the vessel 10. That is to say, the $H_2$ gas is supplied to one surface of the collector mirror 100 from the inside of the vessel 10 and flows along the one surface of the collector mirror 100 to maintain the collector mirror 100 in a clean state while preventing droplet deposits from being deposited on a reflection surface of the collector mirror 100. In addition, the flow of the $H_2$ gas may increase EUV light generating efficiency.

A gas supply control unit 310 may be installed in the gas supply unit 300 to adjust an amount of the water soluble gas (WSG) injected into the cooling unit 200. It is necessary to inject the water soluble gas (WSG) into the cooling unit 200 in an appropriately controlled amount so as not to affect the process. Accordingly, the gas supply control unit 310 may be installed when necessary.

The sensing unit 400 may be disposed on one inner surface of the vessel 10 and may sense kinds and concentrations of gases contained in the vessel 10. In particular, the sensing unit 400 may measure a partial pressure of the water soluble gas (WSG) having leaked into the vessel 10. The sensing unit 400 may include, for example, a residual gas analyzer (RGA).

An operation of the liquid leakage sensing apparatus according to an embodiment of the present inventive concept will be described with reference to FIG. 4. The water soluble gas (WSG) is injected into the cooling unit 200 by the gas supply unit 300 and is supplied to one surface of the collector mirror 100 to adjust a temperature of the collector mirror 100 in a state in which the water soluble gas (WSG) is dissolved in cooling water contained in the cooling unit 200. When a hardware architecture defect is generated in a portion of the cooling unit 200 (e.g., a cooling line or one surface of the cooling unit 200 in contact with the collector mirror 100), the cooling water may leak and the water soluble gas (WSG) dissolved in the cooling water may exist in the inner space of the vessel 10. The sensing unit 400 may sense existence of the water soluble gas (WSG) having leaked to the outside of the cooling unit 200. In particular, the sensing unit 400 may sense a partial pressure of the water soluble gas (WSG) to sense existence of the water soluble gas (WSG) in the vessel 10, thereby sensing leakage of cooling water.

Hereinafter, another embodiment to which the operational principle of the liquid leakage sensing apparatus according to the present inventive concept can be applied will be described.

Figure 5:
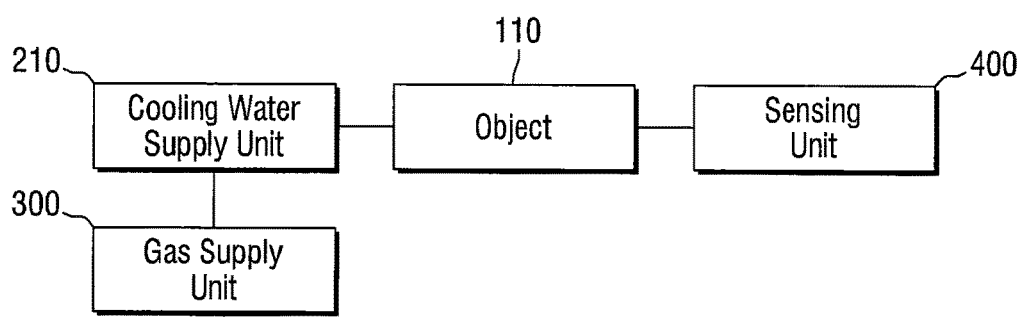
FIG. 5 is a block diagram of a liquid leakage sensing apparatus according to another embodiment of the present inventive concept.
Figure 6:
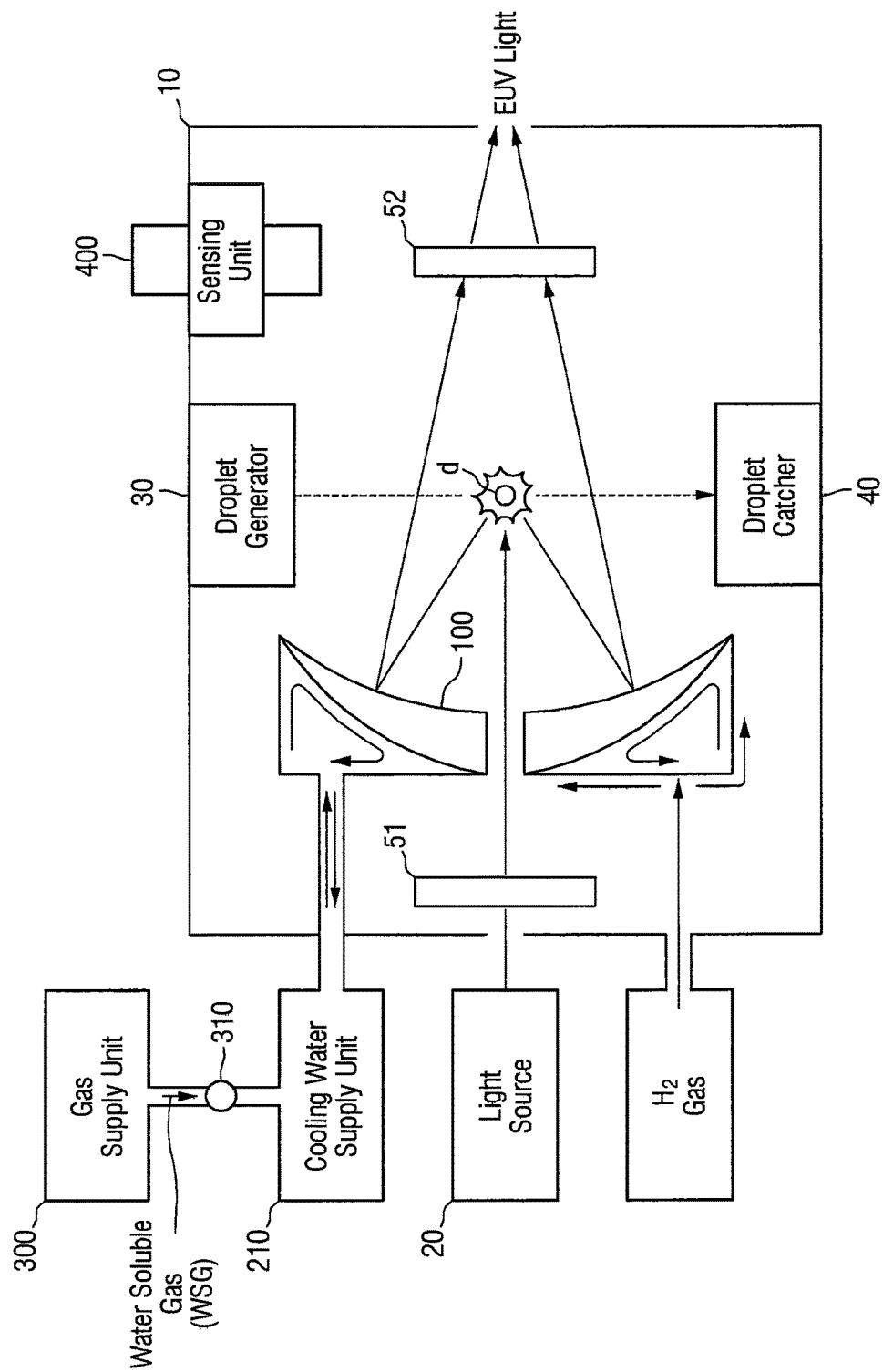
FIG. 6 schematically illustrates the exemplary apparatus shown in FIG. 5.

FIG. 5 is a block diagram of a liquid leakage sensing apparatus according to another embodiment of the present inventive concept and FIG. 6 schematically illustrates the exemplary apparatus shown in FIG. 5. For the sake of brevity and convenient explanation, the following description will focus on differences between the liquid leakage sensing apparatuses according to the present and previous embodiments of the present inventive concept.

Referring to FIG. 5, the liquid leakage sensing apparatus 2 according to another embodiment of the present inventive concept includes an object 110, a cooling water supply unit 210, a gas supply unit 300, and a sensing unit 400.

The object 110 means an arbitrary device providing cooling water and needed to adjust its temperature. Referring to FIG. 6, for example, cooling water may be supplied to a first focusing lens 51 and a second focusing lens 52. Here, the object 110 may be the first focusing lens 51 or the second focusing lens 52.

The first focusing lens 51 may focus first light supplied from a light source 20 and may supply the focused first light to the inside of a vessel 10 via a collector mirror 100. The second focusing lens 52 may focus EUV light reflected from the collector mirror 100 and may emit the focused EUV light to the outside of the vessel 10.

Since the light reaches the first focusing lens 51 and the second focusing lens 52, the first focusing lens 51 and the second focusing lens 52 may have increased temperatures. In order to adjust the temperatures of the first focusing lens 51 and the second focusing lens 52, cooling lines may be additionally provided to supply cooling water to the first focusing lens 51 and the second focusing lens 52. Here, a hardware architecture defect may be generated in the cooling line provided to supply cooling water to the first focusing lens 51 or a hardware architecture defect may be generated in the cooling line provided to supply cooling water to the second focusing lens 52.

As described above, if there is leakage of the cooling water supplied to the first focusing lens 51 or to the second focusing lens 52, the leakage of the cooling water may affect the collector mirror 100 due to prolonged use and may cause droplet deposits to be formed on a reflection surface of the collector mirror 100. Therefore, water soluble gas (WSG) is injected into the cooling water supply unit 210 by the gas supply unit 300 and the water soluble gas (WSG) is dissolved in the cooling water contained in the cooling water supply unit 210. When the cooling water is supplied to the first focusing lens 51 or to the second focusing lens 52, existence of the water soluble gas (WSG) is sensed by the sensing unit 400, thereby sensing leakage of cooling water. Meanwhile, liquid leakage sensing apparatuses according to some embodiments of the present inventive concept may be applied to not only a cooling water supply device but also a device of sensing leakage of chloric acid or fluoric acid from a chloric acid or fluoric acid supply device using various kinds of gases.

The water soluble gas (WSG) may include, for example, at least one of Kr, He, Ar, and $CO_2$. In particular, the water soluble gas (WSG) injected into the cooling water supply unit 210 should be a gas that does not react with a process gas (e.g., $H_2$ gas) contained in the vessel 10.

As described above, the sensing unit 400 may measure a partial pressure of the water soluble gas (WSG) having leaked into the vessel 10. That is to say, the sensing unit 400 may include, for example, a residual gas analyzer (RGA).

Figure 7:
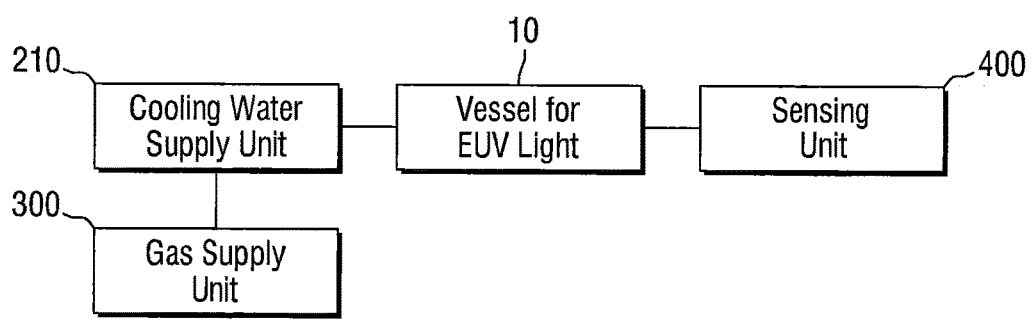
FIG. 7 is a schematic block diagram of a liquid leakage sensing apparatus according to still another embodiment of the present inventive concept.
Figure 8:
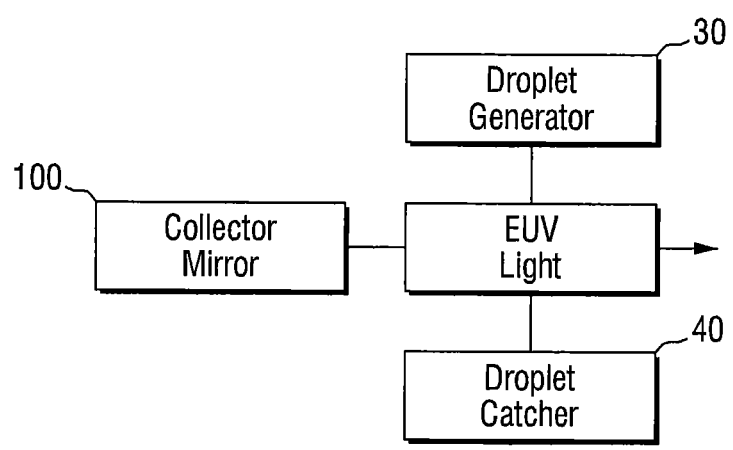
FIG. 8 is a schematic block diagram illustrating internal circuits of a vessel shown in FIG. 7.

FIG. 7 is a schematic block diagram of a liquid leakage sensing apparatus according to still another embodiment of the present inventive concept and FIG. 8 is a schematic block diagram illustrating internal circuits of a vessel shown in FIG. 7. For the sake of brevity and convenient explanation, the following description will focus on differences between the liquid leakage sensing apparatuses according to the present and previous embodiments of the present inventive concept.

Referring to FIG. 7, the liquid leakage sensing apparatus 3 according to still another embodiment of the present inventive concept includes a vessel 10, a cooling water supply unit 210, a gas supply unit 300, and a sensing unit 400.

The vessel 10 is a space for receiving devices for generating EUV light. In the vessel 10, a droplet and light react with each other to generate the EUV light. The vessel 10 may incorporate arbitrary devices. That is to say, the vessel 10 may include arbitrary devices required for generating light necessary to produce EUV light. The vessel 10 may have a generally closed space. However, a hole for light entrance and emission may be formed on one surface of the vessel 10. The EUV light may be emitted through the hole.

FIG. 8 illustrates internal circuits of the vessel 10. For example, a droplet generator 30, a droplet catcher 40, and a collector mirror 100 may be disposed in the vessel 10, which has been substantially the same as described above.

The cooling water supply unit 210 supplies cooling water to the inside of a vessel 10. The cooling water may be supplied to adjust a temperature of the vessel 10 itself or to adjust a temperature of an arbitrary device provided in the vessel 10.

The gas supply unit 300 supplies water soluble gas (WSG) to the cooling water supply unit 210. The cooling water contained in the cooling water supply unit 210 is dissolved in the water soluble gas (WSG) and the cooling water having the water soluble gas (WSG) dissolved therein may be supplied to the inside of the vessel 10.

The water soluble gas (WSG) may include, for example, at least one of Kr, He, Ar, and $CO_2$. In particular, the water soluble gas (WSG) injected into the cooling water supply unit 210 should be a gas that does not react with a process gas (e.g., $H_2$ gas) contained in the vessel 10.

As described above, the sensing unit 400 may measure a partial pressure of the water soluble gas (WSG) having leaked into the vessel 10. That is to say, the sensing unit 400 may include, for example, a residual gas analyzer (RGA).

Figure 9:
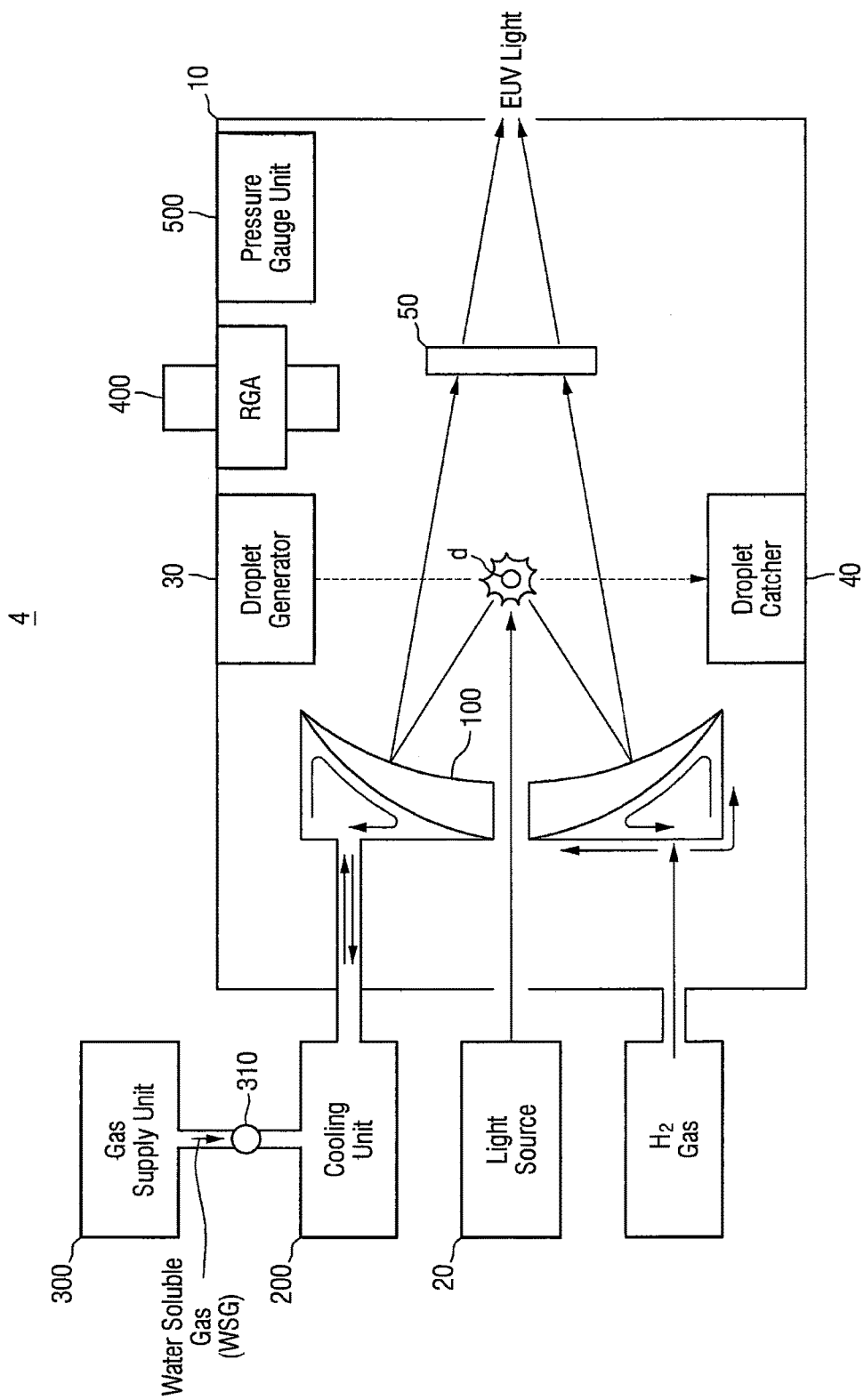
FIG. 9 is a schematic diagram of a liquid leakage sensing apparatus according to still another embodiment of the present inventive concept.
Figure 10:
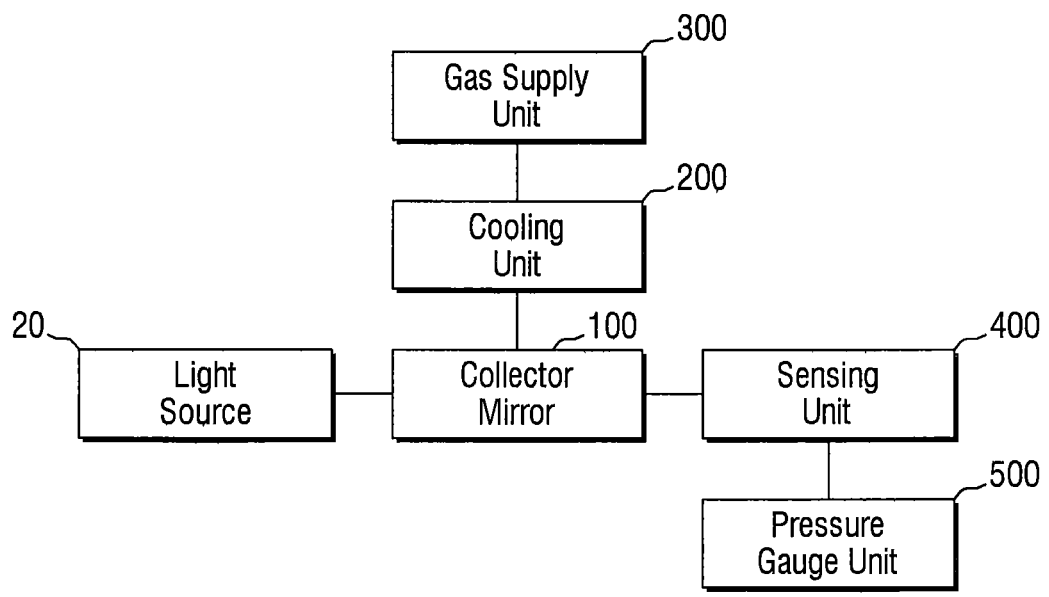
FIG. 10 is a schematic block diagram a liquid leakage sensing apparatus according to still another embodiment of the present inventive concept.

FIG. 9 is a schematic diagram of a liquid leakage sensing apparatus according to still another embodiment of the present inventive concept and FIG. 10 is a schematic block diagram of a liquid leakage sensing apparatus according to still another embodiment of the present inventive concept. For the sake of brevity and convenient explanation, the following description will focus on differences between the liquid leakage sensing apparatuses according to the present and previous embodiments of the present inventive concept.

Referring to FIGS. 9 and 10, the liquid leakage sensing apparatus 4 according to still another embodiment of the present inventive concept includes a vessel 10, a light source 20, a droplet generator 30, a droplet catcher 40, a focusing lens 50, a collector mirror 100, a cooling unit 200, a gas supply unit 300, a sensing unit 400, and a pressure gauge unit 500.

Descriptions of the vessel 10, the light source 20, the droplet generator 30, the droplet catcher 40, the focusing lens 50, the collector mirror 100, the cooling unit 200, the gas supply unit 300, and the sensing unit 400 are substantially the same as those of the liquid leakage sensing apparatus 1 according to previously described embodiments of the present inventive concept.

The pressure gauge unit 500 may measure a pressure change in the vessel 10. When cooling water has leaked from the cooling unit 200, the water soluble gas (WSG) dissolved in the cooling water is supplied to the vessel 10 and the pressure gauge unit 500 measures a pressure of gases in the vessel 10 including the water soluble gas (WSG), thereby sensing leakage of cooling water.

The leakage of cooling water may be sensed by the sensing unit 400 and the pressure gauge unit 500 or may be sensed independently using the sensing unit 400 or the pressure gauge unit 500.

Hereinafter, liquid leakage sensing methods according to some embodiments of the present inventive concept will be described.

Figure 11:
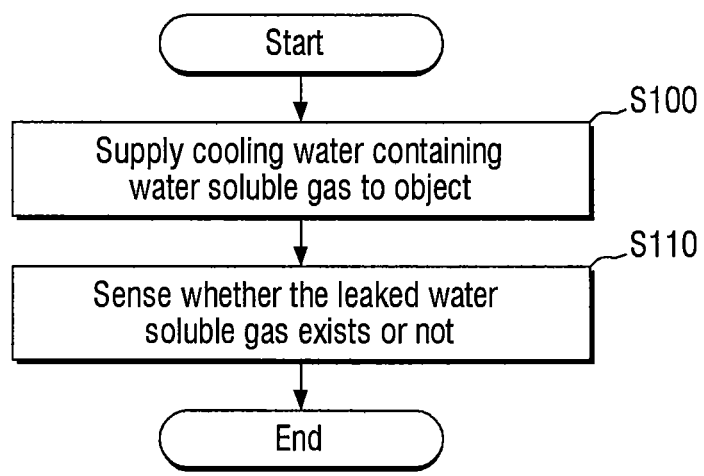
FIG. 11 is a flowchart sequentially illustrating a liquid leakage sensing method according to an embodiment of the present inventive concept.

FIG. 11 is a flowchart sequentially illustrating a liquid leakage sensing method according to an embodiment of the present inventive concept.

Referring to FIG. 11, first, the liquid leakage sensing method according to an embodiment of the present inventive concept includes supplying cooling water having a water soluble gas dissolved therein to an object in a vessel (S100). Here, the object may include, for example, a collector mirror or a focusing lens incorporated in the vessel.

Next, the water soluble gas dissolved in the cooling water leaks to the outside of the object to sense whether the water soluble gas having leaked to the outside of the object exists in the vessel or not (S110).

When the cooling water has leaked to the outside of the object, it is determined that water soluble gas exists in the vessel and leakage of cooling water can be sensed by sensing the water soluble gas existing in the vessel. The water soluble gas may include, for example, at least one of Kr, He, Ar, and $CO_2$. The water soluble gas (WSG) injected into the cooling unit 200 may be a gas that does not react with a process gas (e.g., $H_2$ gas) contained in the vessel 10.

Here, the leakage of cooling water can be sensed by measuring a partial pressure of the water soluble gas dissolved in the cooling water in the vessel.

Figure 12:
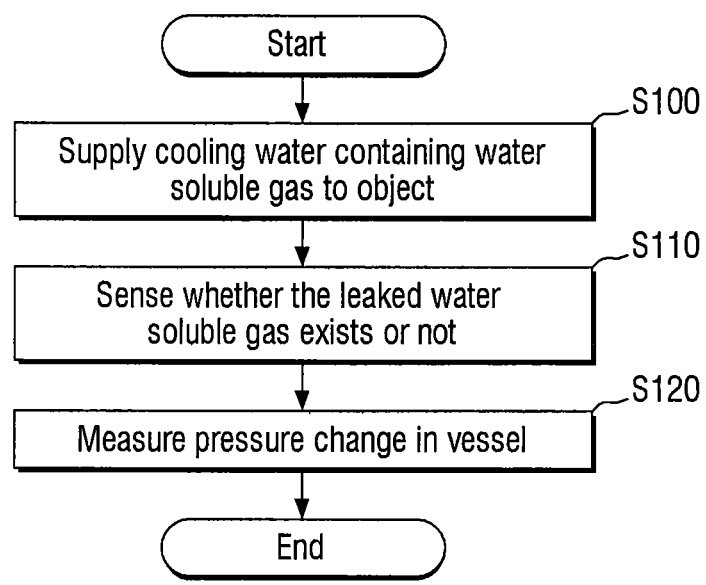
FIG. 12 is a flowchart sequentially illustrating a liquid leakage sensing method according to another embodiment of the present inventive concept.

FIG. 12 is a flowchart sequentially illustrating a liquid leakage sensing method according to another embodiment of the present inventive concept.

Referring to FIG. 12, the liquid leakage sensing method according to another embodiment of the present inventive concept includes supplying cooling water including a water soluble gas to an object in a vessel (S100) and sensing whether the water soluble gas having leaked to the outside of the object exists in the vessel or not (S110).

Additionally, a pressure change in the vessel is measured to determine whether there is leakage of cooling water (S120).

When the cooling water has leaked to the outside of the object, it is determined that the water soluble gas exists in the vessel, and the pressure in the vessel may increase. Therefore, the leakage of cooling water can be determined by measuring the pressure change in the vessel.

Figure 13:
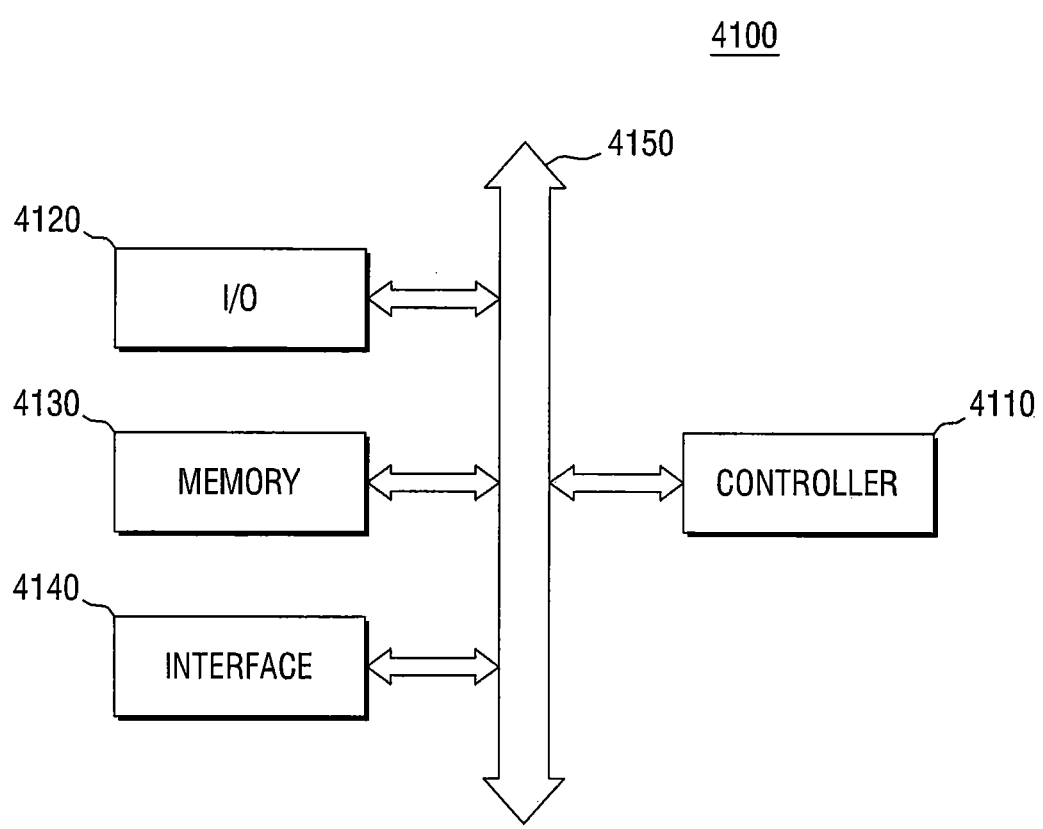
FIG. 13 is a block diagram of an electronic system including a semiconductor device manufactured using a lithography apparatus according to the present inventive concept.

FIG. 13 is a block diagram of an electronic system including a semiconductor device manufactured using a lithography apparatus according to the present inventive concept.

Referring to FIG. 13, the electronic system 4100 according to an embodiment of the present inventive concept may include a controller 4110, an input/output device (I/O) 4120, a memory device 4130, an interface 4140 and a bus 4150.

The controller 4110, the I/O 4120, the memory device 4130 and/or the interface 4140 may be connected to each other through the bus 4150. The bus 4150 corresponds to a path through which data move.

The controller 4110 may include at least one of a microprocessor, a digital signal processor, a microcontroller, and logic elements capable of functions similar to those of these elements.

The I/O 4120 may include at least one selected from a keypad, a keyboard, a display device, and so on.

The memory device 4130 may store data and/or codes.

The interface 4140 may perform functions of transmitting data to a communication network or receiving data from the communication network. The interface 4140 may be wired or wireless. For example, the interface 4140 may include an antenna or a wired/wireless transceiver, and so on.

Although not shown, the electronic system 4100 may further include high-speed DRAM and/or SRAM as a working memory for improving the operation of the controller 4110. The semiconductor devices using a mask for photolithography according to the embodiments of the present inventive concept may be provided in the memory device 4130 or may be provided as some components of the controller 4110 or the I/O 4120.

The electronic system 4100 may be applied to a personal digital assistant (PDA), a portable computer, a web tablet, a wireless phone, a mobile phone, a digital music player, a memory card, or any type of electronic device capable of transmitting and/or receiving information in a wireless environment.

Figure 14:
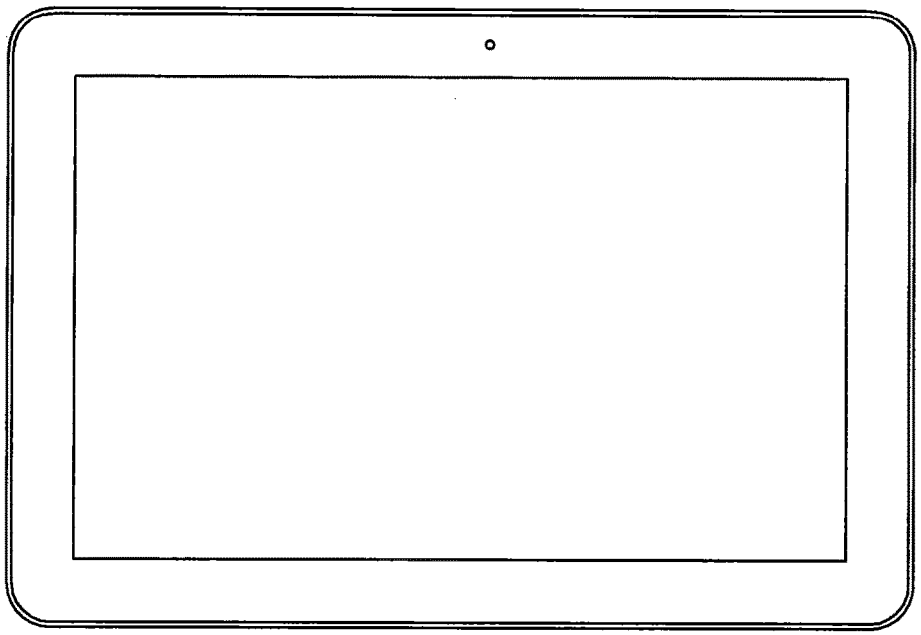
FIGS. 14 and 15 illustrate exemplary semiconductor systems to which a semiconductor device manufactured using a lithography apparatus according to the present inventive concept can be applied.
Figure 15:
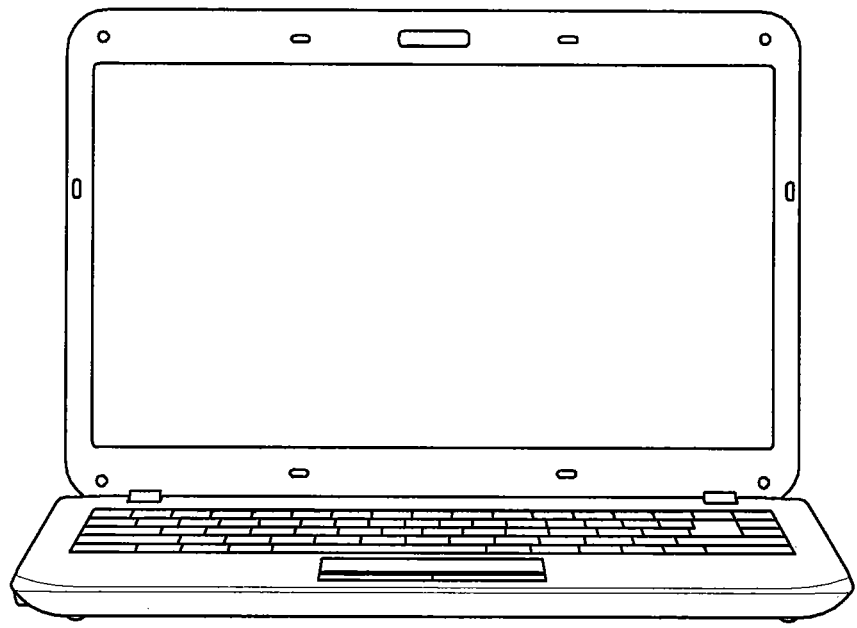

FIGS. 14 and 15 illustrate exemplary semiconductor systems to which a semiconductor device manufactured using a lithography apparatus according to the present inventive concept can be applied.

FIG. 14 illustrates an example in which a semiconductor device according to an embodiment of the present inventive concept is applied to a tablet PC and FIG. 15 illustrates an example in which a semiconductor device according to an embodiment of the present inventive concept is applied to a notebook computer. One skilled in the art would understand that semiconductor devices according to some embodiments of the present inventive concept may also be applied to other IC devices not illustrated herein.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the inventive concept.

What is claimed is:

1. A liquid leakage sensing apparatus, comprising:
a collector mirror;
a cooling unit configured to supply cooling water to one surface of the collector mirror;
a gas supply unit configured to supply a water soluble gas to the cooling unit; and
a sensing unit configured to sense leakage of the water soluble gas from the cooling unit, wherein the sensing unit is configured to measure a partial pressure of leaked water soluble gas.

2. The liquid leakage sensing apparatus of claim 1, wherein the sensing unit comprises a residual gas analyzer (RGA).

3. The liquid leakage sensing apparatus of claim 1, wherein the water soluble gas comprises at least one of Kr, He, Ar, and $CO_2$.

4. A liquid leakage sensing apparatus, comprising:
a vessel;
a light source configured to supply light to the vessel;
a droplet generator configured to generate a droplet;
a collector mirror disposed in the vessel and configured to collect and reflect extreme ultraviolet (EUV) light generated by a reaction between the light and the droplet;
a cooling unit configured to supply cooling water to one surface of the collector mirror to adjust a temperature of the collector mirror;
a gas supply unit configured to supply a water soluble gas to the cooling unit; and
a sensing unit configured to sense leakage of the water soluble gas from the cooling unit within the vessel, wherein the sensing unit is configured to measure a partial pressure of leaked water soluble gas.

5. The liquid leakage sensing apparatus of claim 4, further comprising a pressure gauge unit configured to measure a pressure change in the vessel.

6. The liquid leakage sensing apparatus of claim 4, wherein the sensing unit comprises a residual gas analyzer (RGA).

7. The liquid leakage sensing apparatus of claim 4, wherein the water soluble gas does not react with a process gas in the vessel.

8. The liquid leakage sensing apparatus of claim 7, wherein the process gas comprises $H_2$.

9. The liquid leakage sensing apparatus of claim 8, wherein the water soluble gas comprises at least one of Kr, He, Ar, and $CO_2$.

10. The liquid leakage sensing apparatus of claim 4, wherein the light source comprises a $CO_2$ laser.

11. The liquid leakage sensing apparatus of claim 10, wherein the droplet comprises tin (Sn).

12. The liquid leakage sensing apparatus of claim 4, further comprising an object disposed within the vessel, and wherein the cooling unit is configured to supply the cooling water to a receiving space formed in contact with one surface of the object.

* * * * *